United States Patent [19]

Li

[11] Patent Number: 4,472,770
[45] Date of Patent: Sep. 18, 1984

[54] SELF-OPTIMIZING METHOD AND MACHINE

[76] Inventor: Chou H. Li, 379 Elm Dr., Roslyn, N.Y. 11576

[21] Appl. No.: 428,277

[22] Filed: Sep. 29, 1982

Related U.S. Application Data

[63] Continuation-in-part of Ser. No. 275,758, Jun. 22, 1981, Pat. No. 4,368,509, which is a continuation-in-part of Ser. No. 069,297, Aug. 24, 1979, abandoned.

[51] Int. Cl.$^3$ .................... G05B 13/02; G05B 13/04
[52] U.S. Cl. ............................ 364/148; 364/149; 364/152; 364/178
[58] Field of Search ...................... 364/148–166, 364/178, 179, 425, 442, 479, 497, 431.04, 560, 501, 502

[56] References Cited

U.S. PATENT DOCUMENTS

| | | | |
|---|---|---|---|
| 3,460,096 | 8/1969 | Barron | 364/152 X |
| 3,466,430 | 9/1969 | Hardaway | 364/155 |
| 3,519,998 | 7/1970 | Barron | 364/152 X |
| 3,576,976 | 5/1971 | Russo | 364/152 X |
| 3,694,636 | 9/1972 | Smith, Jr. | 364/152 X |
| 4,368,509 | 1/1983 | Li | 364/148 |

OTHER PUBLICATIONS

Li—"Worksheet Gives Optimum Conditions"—Chemical Engineering—Apr. 7, 1958.
Munson et al.—"Optimization by Random Search on the Analog Computer—National Simulation Conf.," Dallas, Texas, Oct. 25, 1968.
Ramsay—"A Family of Gradient Methods of Optimization"—The Computer Journal—vol. 13, No. 4, Nov. 1970, pp. 413–417.

Primary Examiner—Joseph F. Ruggiero

[57] ABSTRACT

The invention discloses method for self-optimizing, dynamically and in real time, a machine relative to a specific performance characteristic in response to variations on a prescribed number m of variables. This method comprises statistically designing a matrix of operating conditions of the machine; sequentially operating the machine according to the designed matrix of operating conditions; testing the performance characteristic of the thus-operated machine; analyzing the tested performance characteristic against a given optimizing criterion; and feeding back for or returning to the designing step for a new, improved operating condition. A machine in the form of programmed microprocessor embodying this self-optimizing method is also disclosed.

16 Claims, 2 Drawing Figures

SELF-OPTIMIZING METHOD AND MACHINE

CROSS REFERENCE

This is a continuation-in-part of U.S. application No. 275,758, filed June 22, 1981, now U.S. Pat. No. 4,368,509 and my pending PCT application Ser. No. PCT/US 82-00845, filed June 22, 1982. The U.S. application itself was a continuation-in-part of my former U.S. application Ser. No. 069,297, filed Aug. 24, 1979 abandoned. I hereby incorporate by reference all these three pending applications.

BACKGROUND

1. Field

The invention relates to self-optimizing method and machine, and more particularly relates to method for self-optimizing, and machine which self-optimizes, dynamically and in real time.

2. Prior Art

Robotics has been considered essential to enhanced productivity and standard of living for the coming years. It is a highly competitive and rapidly growing industry. The industry is full of hard-working, reknowed scientists, engineers, and skilled workers diligently working day and night. All over the world, new institutions are being specially set up to develop new robots and particularly to provide "artificial intelligence" to robots. These robots are still to be controlled and programmed by the human, who is not only imperfect, inconsistent, non-durable but, above all, million times slower than modern microprocessors in data input or recall, comparing, calculating, correlating, analyzing, commanding.

Still, present-day robots are extremely useful. By transfering intelligence, instead of skill, from human to machine, they have ushered us from the First Industrial Revolution into this exciting, Second Industrial Revolution. Unfortunately and contrary to long-felt need, they are dumb, inheriting all the defects of, and at every step along the way totally depending on the imperfect and slow human sampler, tester, data analyzer, programmer, and machine builder.

Existing robots are also inaccurate, and non-uniformly so on the working space, because of engineering compromises, inertia effects, and tolerance variations that cause the operation of any given controlled system to deviate from the standard assumed for design purposes. This standard or response function varies with individual machines, parts, materials, environments, persons. No wonder optimum conditions are often never achieved. To render a robot "artificially intelligent", one usually: (1) arbitrarily samples a very restricted number of *previously made* machines (having unknown but chance combinations of materials and parts); (2) tests them within narrow experimental ranges (one, two, or three parameters by assuming all other being unimportant); (3) analyzes the test results to obtain an "average response function"; and (4) develops a fixed computer program based on this average response function. This procedure is imperfectregulations. Each of the equipment, materials, parts, environment, . . . categories may contain tens, hundreds, or more parameters that affect the performance characteristic or response function. All these parameters should be tested; none can be eliminated apriori. Yet even tested at only two levels for each parameter, the required number of tests, i.e., $n = 2^m$ for m parameters becomes quickly unmanageable and totally impractical. The conventional robotic intelligence approach is thus forced not to follow the above rules of good optimization resorting, instead, to merely hoping, assuming, and extrapolating.

Accordingly, an object of the present invention to provide improved self-optimizing machine and method;

A further object of the invention is to provide self-optimizing machines or method equipped with modern microprocessors with nanosecond computing speeds and programmed to generate statistical design matrices capable of handling tens, hundreds, thousands, or more parameters in real time;

Another object of this invention is to provide self-optimizing machines and method which can be optimized almost continuously and instantly.

A broad object of the invention is to provide self-optimizing machines and method based on controlled tests performed on the very particular machines or method themselves without relying on extrapolations based on sampled test results obtained on other similar but often different or even irrelevant machines or methods;

Another object of the invention is to optimize machines, dynamically and in real time, by the installation on the machines batteries of modern microelectronics, sensors, actuators, signal-transmission lines, and related devices;

A further object of the invention is to provide small (less than 0.1 or 0.001 $m^3$), rapid (nanosecond), efficient self-optimizing machines to fit into small or subcompact but fast moving cars, handdrills or other appliances, rapidly reacting furnaces, or dying patients for instantly correcting deviations from ideal conditions or for dispensing necessary chemicals or drugs in optimum combinations in a continuous manner;

A further object of the invention is provide self-optimizing machines which do not just passively adapt to one or two parameters in the environment, but actively seek and automatically set at the instantaneous optimum combination of the many parameters in the equipment, materials, parts, environment, personnel, and other categories, the machines substantially continuously designing, manufacturing or processing, testing, analyzing data and optimizing, and around-the-clock and 100% checking, with instant feed-back to supply design data for redesigning, retesting, reoptimizing.

Further objects and advantages of my invention will appear as the specification proceeds.

SUMMARY

To these ends, the present invention provides a method for self-optimizing a machine by selecting an efficient, statistical design; adjusting the comditions of the m variables according to the design matrix; performing the necessary tests; collecting and recording many sets of data on the performance characteristic to be optimized; analyzing the data on the machine itself to determine the functional relationship between the variables and the performance characteristic; computing the unique combination (for a particular time instant, machine condition, equipment, environment, personnel) of the many variables or parameters which improves or optimizes the critical performance characteristic, continuously and instantly. A machine operating on the basis of this method is also disclosed.

BRIEF DESCRIPTION

The invention and its further objects and features will be more clearly understood from the following detailed description taken in conjunction with the drawings in which.

BEST MODES

The method and machines of the invention is of general applicability for self-optimizing many and various machines or processes, dynamically and in real time, and with lightening speeds in the dealing of tens, hundreds, thousands, or more variables requiring tens of millions, billions, or more calculating steps.

Figure 1:
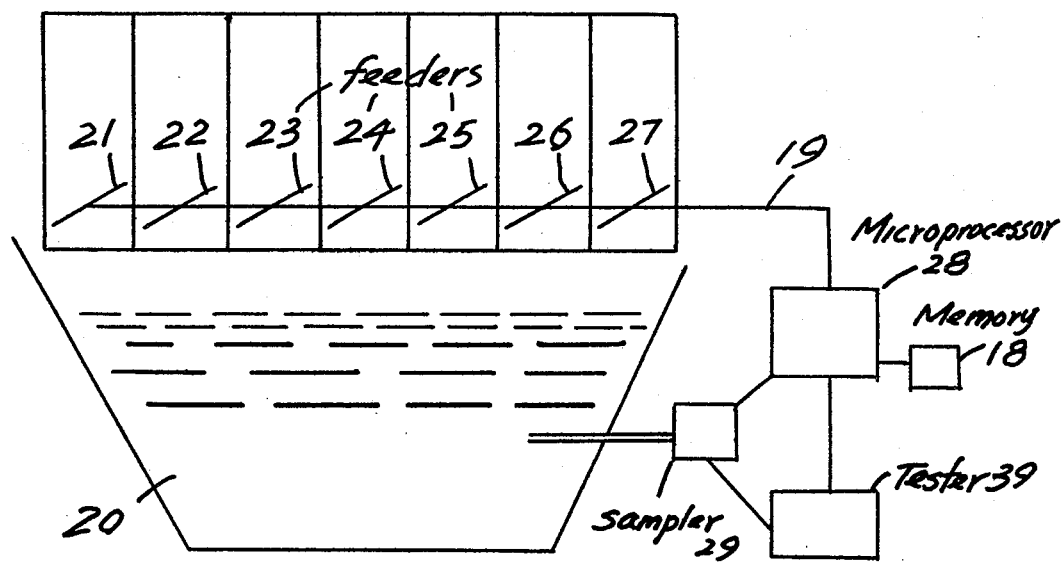
FIG. 1 shows a self-optimizing furnace for a special iron-base alloy.

FIG. 1 shows a machine 20 in the form of a furnace to make special iron-base alloy. The furnace is self-optimized relative to a specific performance characteristic, e.g., hot tensile strength of the resultant alloy produced on the furnace in response to variations in a fixed number (e.g., m=7) of variables or chemical elements for alloying. This machine or furnace has a built-in microprocessor 28 which first sets up a statistical design matrix of operating or alloying procedures or conditions, and then directs, through the transmission line 19, the seven actuators or alloy elements feeders 21–27. The furnace then makes 8 tests or melts of iron-base alloys, which are sampled by sampler 29 and tested on tester 39, with the test results on the performance characteristic (i.e., hot tensile strength) transmitted to the microprocessor 28 (with attached memory 18) for data analysis to find the effects of the various variables, the steepest-ascent path, and instantaneous optimum combination. The mictesting, data analyzing, and adjusting the feeders 21–27 are repeated so that the furnace conditions are always maintained optimal. Details of the principle and operation of the self-optimizing method and machine are provided in my applications, both U.S. and PCT. Computer programming for the optimizing method is also given therein. Note that the design matrix allows the reduction of the number of tests n from the combinationally required $2^m$ possibly to only m+1. Foritude less computing steps and computer time. These features make real-time self-optimization possible, even with complicated modern machines or products involving many variables or parameters on the equipment, materials, parts, personnel, environment, rules and regulations.

Very minor and slight modification of the above self-optimizing machine yields a drug-searching or prescribing machine self-optimized to dispensing the optimum combination of drugs such as chemicals, plants, animal tissues, bacteria, through the feeders 21–27 into a drug-feeding device, such as a hypodermic needle, mouth feeder, or implanted feeder to dispense the optimum combination of drugs in a substantially continuous manner or periodically. The tester 29 is then used to test the medical conditions of the human or animal patient as to, for example, vital functions of the organs, chemistry of the blood, urine, and other liquids, or other physiological data to be optimized. To search or screen among thousands or millions of drugs for a few that can cure a critical disease such as cancer, my sequential screening technique given in the Journal of American Statistical Association, Vol. 57, pp. 455–477, 1962, may be used, as has been disclosed in my pending applications. Even combinations of drugs which cure can be located and delivered to the patient.

Figure 2:
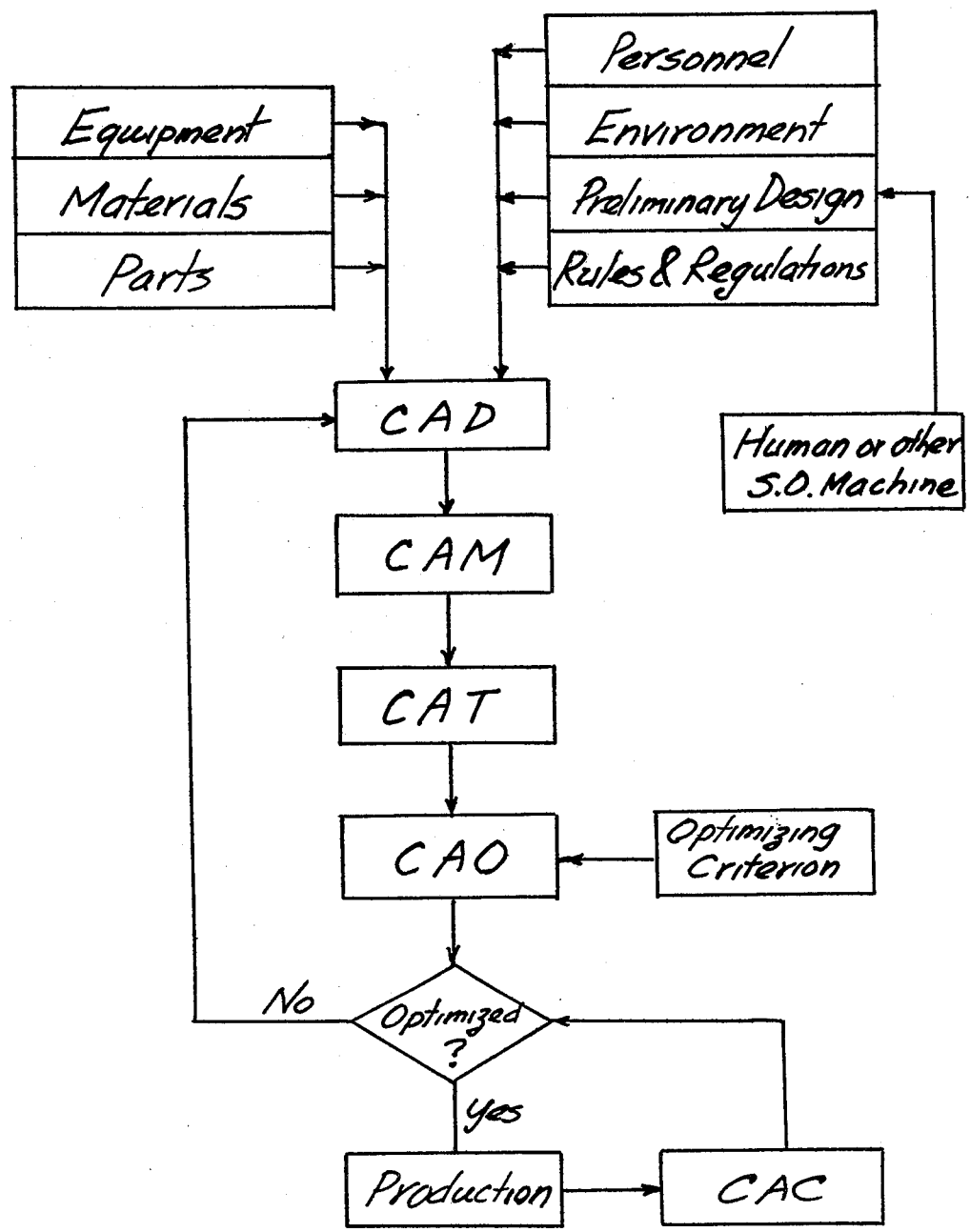
FIG. 2 shows the flowchart of the self-optimizing method employed for an automatic manufacturing system.

The flowchart of FIG. 2 shows that the microprocessor 28 of FIG. 1 is first fed with information (i.e., limits, constraints, and even some rough functional relationship between the various parameters or elements on the performance characteristic) in the different categories including: equipment, materials, parts, personnel, environment, government rules and regulations, . . . as well as preliminary design data supplied by human or other self-optimizing machine (through telecommunication, for example). The microprocessor then not only provides computer assistance, but in a continuous and automatic manner, designs (CAD) the test matrix of new alloys, manufactures (CAM) or processes the designed alloys, samples and tests (CAT) the resultant alloys (for hot strengths), analyzes the test data and optimizes (CAO) according to a given optimizing criteria. The status of optimization is continuously checked for possible feed-back of all existing data up-to-the-moment to the microprocessor for redesign, reprocessing, retesting. Meanwhile, the produced alloys are around-the-clock and 100% checked (CAC) to see also if they are always optimized.

It can readily been seen that the self-optimizing method and machines of this invention can be used for other industrial manufacturing or processing, machine tool work, computer plotting, automobiles and other transportation vehicles, mineral-mining or oil drilling, smart appliances or weaponary, medical treatment system, and even research and development machine.

As disclosed in the parent patent, U.S. Pat. No. 4,368,509, Col. 4, lines 43–44 and Col. 1 line 68 to Col. 2 line 1 or parameters to optimize the combination of m variables at two levels or conditions each requires as few as $n_n = m+1$ tes $\times 10^{38}$ while $n_n = 128$, i.e., a reduction in test number n by a factor of $1.329 \times 10^{36}$. To operate (i.e., calculate) on each of these data only once even on a nanosecond computer would require $5.395 \times 10^{21}$ years for the conventional method, an impossible task. This is, of course, the famous problem of combinatorial explosion and computer intractability. The data analyses according to my method as disclosed in column 9, lines 14–20 of '509 require, on the same nanosecond computer, a mere $m \times (4+6n) = 5.404$ operations taking only $5.404 \times 10^{-6}$ seconds, or a reduction by a factor of $3.148 \times 10^{34}$ relative to the conventional method. Hence, with suitable input (sensors) and output (actuators) devices, each CAD-CAM-CAT-CAO optimization cycle in the flowchart of FIG. 2 takes only micro or milli-seconds. While microscopically on the time scale this new self-optimizing method still contains the several discrete, distinct, and sequential steps, the entire optimizing cycle and method, for all practical purposes particularly as viewed by the human, can be considered as "substantially continuous" or even "continuous". These substantially continuous looping cycles, aided by the instant data analyses (through the greatly reduced number of tests and computational steps), make real-time self-optimization not only possible but practical, even for complex, real-world situations.

The advantages offered by the invention are many:

1. Dynamic and real-time optimization is done on the particular and relevant machines of interest and with the very materials, parts, personnel, environment, employed for the given operation. There are no errors due to sampling and extrapolation (from machine to machine, part to part, and time instant to time instant);

2. Optimization is done systematically, efficiently, (many orders of magnitude) more rapidly, and reproducibly, and not by random trial-and-error. Efficient statistical designs, in particular, increase the experimental range (e.g., number of parameters) and reduce the number of required tests, calculating steps, computer time, by many orders of magnitude, thereby enabling real-time optimization;

3. The machines of the invention do not just passively adapt or adjust to changes in one or two environmental parameters; they actively and continuously seek and set at the instantaneous optimum combination of the many parameters in the different categories;

4. Flexible, consistent, and fool-proof;

5. Performance either optimized or continuously improving;

6. Human control, guidance, intervention, . . . , are eliminated because it is not only undesirable but impossible due to the extremely limited human (dedicated) memory and speed of memory recall, reading, comparing, calculating, correlating, commanding, "Intelligence" transfer is now from machine to machine, leading us into the Third Industrial Revolution:

7. Smart, self-optimizing machines with "true" (not artificial) intelligence, long wanted everywhere and worked on by many for years, become realizable.

The invention is not to be construed as limited to the particular forms disclosed herein, since there are to be regarded as illustrative rather than restictive.

I claim:

1. A method for self-optimizing, in real time, a machine relative to a specific performance characteristic in response to variations on a prescribed number m of variables or parameters comprising:

programming the machine to cause it to plan, by itself and without human control and intervention, a statistical design which prescribes the number n of tests and the exact design matrix in which the test level of each of the m variables is specified for all the n tests;

according to the design matrix substantially continuously performing said n designed tests on the very particular machine without relying on extrapolations based on sampled test results obtained on other similar but often different or even irrelevant machines so as to eliminate errors due to sampling and extrapolation from machine to machine, part to part, and time instant to time instant;

substantially continuously collecting and analyzing the resultant n sets of test data on the test levels of the m variables and the associated performance characteristic to determine the functional relationship between said variables and said specific performance characteristic;

from the functional relationship determining the combination of the conditions of said m variables that gives optimum value for the specific performance characteristic for the particular machine, environment, and time; and setting the conditions or levels of said m variables at their respective, thusdetermined conditions.

2. The method as in claim 1 wherein the programming is done to cause the machine itself to plan said statistical design which reduces many fold the number of combinationally required tests, the calculating steps, and the computer time thereby enabling the experimental range to be increased many fold to handle a multitude of variables and, more importantly, to achieve real-time self-optimization.

3. The method as in claim 2 wherein said machine is a machine for manufacturing a prespecified product and including substantially continuously manufacturing said product on said machine, said collecting and analyzing step comprising collecting and analyzing quality test data on the thus-manufactured product.

4. The method as in claim 1 wherein all said machine statistical planning, performing, collecting and analyzing, determining, and setting steps are done within a minute.

5. The method as in claim 4 wherein all said steps are done within a second and yet m exceeds 25.

6. The method as in claim 2 wherein said machine is a machine for manufacturing a prespecified product and including checking the quality of the resultant product around the clock and reself-optimizing the machine when the quality is not optimal.

7. The method as in claim 2 including repeating all said performing, collecting and analyzing, determining, and setting steps within every minute so that the machine conditions are always maintained optimal.

8. The method as in claim 2 including providing a second self-optimizing machine similar to said machine; and telecommunicating the optimizing procedures including said functional relationship and said combination of conditions, from said second machine to said machine, thereby reducing the time required for said machine to achieve self-optimization.

9. A machine for self-optimizing, in real time, a specific performance characteristic in response to variations on a prescribed number m of variables comprising:

means for planning a statistical design which prescribes the number n of tests and the exact design matrix in which the test level of each of the m variables is specified for all the n tests;

means for substantially continuously performing said n designed tests on the very particular machine without relying on extrapolations based on sampled test results obtained on other similar but often different or even irrelevant machines so as to eliminate errors due to sampling and extrapolation from machine to machine, part to part, and time instant to time instant;

means for substantially continuously collecting and analyzing the resultant n sets of test data on the test levels of the m variables and the associated performance characteristic to determine the functional relationship between said variables and said performance characteristic;

means for determining the combination of the conditions of said m variables that gives optimum value for the specific performance characteristic for the particular machine, environment, and time; and means for setting the conditions or levels of said m variables at their respective, thus-determined conditions.

10. The machine as in claim 9 wherein said planning means plans said statistical design on the machine itself without human control and intervention.

11. The machine as in claim 10 wherein said planning means plans said statistical design which reduces many fold the number of combinationally required tests, the calculating steps, and the computer time thereby enabling the experimental range to be increased many fold to handle a multitude of variables and, most importantly, to achieve real-time optimization.

12. The machine as in claim 11 in the form of a manufacturing machine for a perspecified product and said collecting and analyzing means comprising means for collecting and analyzing quality test data on the thus-manufactured product.

13. The machine as in claim 11 wherein said planning, performing, collecting and analyzing, determining, and setting means jointly perform their tasks with a cycle time of less than a minute and yet m exceeds 25; and including means for checking the product quality around the clock to determine if additional self-optimizing cycles are needed.

14. The method as in claim 1 for practice on the machine in conjunction with a second, physically independent but telecommunicable machine having similar but not exactly identical performance characteristics under the same operation condition as the machine; and including the additional step of telecommunicating from the machine to the second machine as to the calculated singular combination for starting up the self-optimizing procedure on the second machine thereby reducing the time required to achieve the similar, singular combination on the second machine.

15. The machine as in claim 9 including a second, physically independent but telecommunicable machine having similar but not exactly identical performance characteristics under the same operation condition as the machine; and including also means for telecommunicating from the machine to the second machine as to the optimizing combination of the conditions of said m variables for starting up the self-optimizing method on the second machine thereby reducing the time required to achieve the similar, optimizing combination on the second machine.

16. The product of method claim 1.

* * * * *

UNITED STATES PATENT AND TRADEMARK OFFICE
CERTIFICATE OF CORRECTION

PATENT NO. : 4,472,770
DATED : September 18, 1984
INVENTOR(S) : Chou H. Li

It is certified that error appears in the above-identified patent and that said Letters Patent are hereby corrected as shown below:

Col. 1, line 61, "imperfectregulations" should be: --imperfect, inefficient, and often irrelevant.
Thus, meaningful optimization must be done dynamically and in real time, with the very machine itself and the particular combination of other equipment, materials, parts, environment, governmental rules and regulations.--

Col. 3, line 38, "mic" should be: --microprocessor 28 then directs the feeders 21-27 to provide the optimum combination of the alloy elements into the molten iron melt in the furnace 20 for optimized alloy manufacture. Periodically, i.e., every hour, minute, or second, the sampling, --

Col. 3, line 42, "my applications" should be: --my pending applications--.

UNITED STATES PATENT AND TRADEMARK OFFICE
CERTIFICATE OF CORRECTION

PATENT NO. : 4,472,770
DATED : September 18, 1984
INVENTOR(S) : Chou H. Li

It is certified that error appears in the above-identified patent and that said Letters Patent are hereby corrected as shown below:

Col. 3, line 47, "Foritude less" should be: --For example, as given in the above-mentioned patent, when m=200, n is reduced by 58 orders of magnitude from $1.606 \times 10^{60}$ to only 256. The effects of these 200 parameters are readily determined with orders of magnitude less--.

Col. 4, lines 36-37, "or parameters to optimize the combination of m variables" should be: --to optimize the combination of m variables or parameters--.

Col. 4, line 38, "tes" should be --tests, provided $n_n = 2^k > m$ where k is an integer. The conventional testing or complete search of an interacting m-parameter space, however, requires $n_c = 2^m$ tests. For example, when m=127, $n_c = 1.701$--.

Claim 16, "The product of method claim 1" should be: --The product of method claims 1 through 7--.

Signed and Sealed this

Fifteenth Day of October 1985

[SEAL]

Attest:

DONALD J. QUIGG

Attesting Officer

Commissioner of Patents and Trademarks—Designate